US012460081B2

(12) United States Patent
de Gans et al.

(10) Patent No.: US 12,460,081 B2
(45) Date of Patent: Nov. 4, 2025

(54) CURABLE CONDENSATION COMPOUNDS BASED ON ALKOXY-FUNCTIONAL POLYSILOXANES

(71) Applicant: Evonik Operations GmbH, Essen (DE)

(72) Inventors: Berend-Jan de Gans, Muelheim an der Ruhr (DE); Wilfried Knott, Essen (DE); Horst Dudzik, Essen (DE); Markus Hallack, Schermbeck (DE); Florian Düllmann, Hagen (DE); Philippe Favresse, Ratingen (DE)

(73) Assignee: Evonik Operations GmbH, Essen (DE)

( * ) Notice: Subject to any disclaimer, the term of this patent is extended or adjusted under 35 U.S.C. 154(b) by 481 days.

(21) Appl. No.: 18/058,762

(22) Filed: Nov. 24, 2022

(65) Prior Publication Data

US 2023/0159756 A1    May 25, 2023

(30) Foreign Application Priority Data

Nov. 25, 2021  (EP) .................................... 21210450

(51) Int. Cl.
  *C08L 83/06*  (2006.01)
  *C08G 77/08*  (2006.01)
  *C09D 183/06*  (2006.01)

(52) U.S. Cl.
  CPC ............. *C08L 83/06* (2013.01); *C08G 77/08* (2013.01); *C09D 183/06* (2013.01)

(58) Field of Classification Search
  CPC ......... C08L 83/06; C08G 77/08; C08G 77/14; C08G 77/18; C08G 77/44; C08G 2150/00; C09D 183/06; C09D 5/1662; C09D 183/10
  See application file for complete search history.

(56) References Cited

U.S. PATENT DOCUMENTS

| | | | |
|---|---|---|---|
| 3,032,529 A | 5/1962 | Clark | |
| 4,585,705 A | 4/1986 | Broderick et al. | |
| 5,357,024 A | 10/1994 | Leclaire | |
| 5,371,161 A | 12/1994 | Knott | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,645,848 B2 | 1/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 7,838,603 B2 | 11/2010 | Schwab et al. | |
| 8,138,294 B2 | 3/2012 | Henning et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,420,748 B2 | 4/2013 | Henning et al. | |
| 8,450,514 B2 | 5/2013 | Schubert et al. | |
| 8,598,295 B2 | 12/2013 | Henning et al. | |
| 8,623,984 B2 | 1/2014 | Henning et al. | |
| 8,722,834 B2 | 5/2014 | Knott et al. | |
| 8,779,079 B2 | 7/2014 | Henning et al. | |
| 8,946,369 B2 | 2/2015 | Henning et al. | |
| 9,068,044 B2 | 6/2015 | Schubert et al. | |
| 9,975,909 B2 | 5/2018 | Schubert et al. | |
| 10,399,998 B2 | 9/2019 | Knott et al. | |
| 10,414,871 B2 | 9/2019 | Knott et al. | |
| 10,752,735 B2 | 8/2020 | Knott et al. | |
| 10,766,913 B2 | 9/2020 | Knott et al. | |
| 10,954,344 B2 | 3/2021 | Knott et al. | |
| 11,021,575 B2 | 6/2021 | Knott et al. | |
| 11,066,429 B2 | 7/2021 | Knott et al. | |
| 11,220,578 B2 | 1/2022 | Knott et al. | |
| 11,236,204 B2 | 2/2022 | Favresse et al. | |
| 11,261,298 B2 | 3/2022 | Favresse et al. | |
| 11,279,804 B2 | 3/2022 | Knott et al. | |
| 11,286,351 B2 | 3/2022 | Knott et al. | |
| 11,286,366 B2 | 3/2022 | Knott et al. | |
| 11,345,783 B2 | 5/2022 | Knott et al. | |
| 11,359,056 B2 | 6/2022 | Knott et al. | |
| 11,377,523 B2 | 7/2022 | Favresse et al. | |
| 11,420,985 B2 | 8/2022 | Knott et al. | |
| 11,472,822 B2 | 10/2022 | Knott et al. | |
| 11,498,996 B2 | 11/2022 | Knott et al. | |
| 2002/0161158 A1 | 10/2002 | Burkhart et al. | |
| 2004/0132951 A1 | 7/2004 | Burkhart et al. | |
| 2004/0147703 A1 | 7/2004 | Burkhart et al. | |

(Continued)

FOREIGN PATENT DOCUMENTS

| CA | 3051621 A1 * | 2/2020 | ............. C08G 77/10 |
|---|---|---|---|
| CA | 3121101 A1 * | 6/2020 | ............. C08G 77/38 |

(Continued)

OTHER PUBLICATIONS

European Search Report dated May 4, 2022, in EP Application No. 21210450.9, 5 pages.
Herman F. Mark et al., "Silicones", Subito, Encyclopedia of polymer science & technology, Nov. 16, 2020, pp. 1112-1116.
Ratner et al., "Biomaterials Science", An Introduction to Materials in Medicine, Second Edition, 2004, pp. 83-84.
Jaumann Manfred et al., "Hyperbranched Polyalkoxysiloxanes via $AB_3$-Type Monomers", Macromolecular Chemistry and Physics, vol. 204, 2003, pp. 1014-1026.
Jaumann Manfred, "Hyperbranched Polyalkoxysiloxanes Synthesis, Characterization and Applications", Sep. 4, 2008, pp. 1-259.

(Continued)

Primary Examiner — Doris L Lee

(74) Attorney, Agent, or Firm — Grüneberg and Myers PLLC

(57) ABSTRACT

Curable condensation compounds are obtainable by a reaction of non-end-equilibrated acetoxy group-bearing siloxanes with at least one alkoxy-functional polysiloxane, in the presence of a catalyst.

25 Claims, No Drawings

(56) References Cited

U.S. PATENT DOCUMENTS

| | | |
|---|---|---|
| 2006/0155089 A1 | 7/2006 | Ferenz et al. |
| 2006/0241270 A1 | 10/2006 | Burkhart et al. |
| 2007/0049717 A1 | 3/2007 | Knott et al. |
| 2008/0153934 A1 | 6/2008 | Neumann et al. |
| 2008/0153992 A1 | 6/2008 | Knott et al. |
| 2008/0153995 A1 | 6/2008 | Knott et al. |
| 2008/0221276 A1 | 9/2008 | Schwab et al. |
| 2009/0226609 A1 | 9/2009 | Boisvert et al. |
| 2010/0041910 A1 | 2/2010 | Schubert et al. |
| 2010/0056649 A1 | 3/2010 | Henning et al. |
| 2010/0081781 A1 | 4/2010 | Schubert et al. |
| 2010/0105843 A1 | 4/2010 | Knott et al. |
| 2010/0168367 A1 | 7/2010 | Schubert et al. |
| 2010/0249339 A1 | 9/2010 | Henning et al. |
| 2010/0298455 A1 | 11/2010 | Henning et al. |
| 2011/0021693 A1 | 1/2011 | Henning et al. |
| 2011/0172373 A1 | 7/2011 | Knott et al. |
| 2011/0245412 A1 | 10/2011 | Schubert et al. |
| 2011/0301254 A1 | 12/2011 | Knott et al. |
| 2012/0046486 A1 | 2/2012 | Henning et al. |
| 2012/0296125 A1 | 11/2012 | Schubert et al. |
| 2013/0041115 A1 | 2/2013 | Knott et al. |
| 2013/0217907 A1 | 8/2013 | Henning et al. |
| 2013/0245304 A1 | 9/2013 | Schubert et al. |
| 2014/0256844 A1 | 9/2014 | Henning et al. |
| 2016/0075918 A1 | 3/2016 | Bögershausen et al. |
| 2016/0208050 A1* | 7/2016 | Klotzbach ............ C08L 83/04 |
| 2017/0298250 A1 | 10/2017 | Anselmann et al. |
| 2018/0134850 A1 | 5/2018 | Knott et al. |
| 2018/0319823 A1 | 11/2018 | Knott et al. |
| 2019/0100625 A1 | 4/2019 | Knott et al. |
| 2019/0106441 A1 | 4/2019 | Knott et al. |
| 2020/0055991 A1 | 2/2020 | Knott et al. |
| 2020/0055992 A1* | 2/2020 | Knott ..................... C08G 77/46 |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377526 A1 | 12/2020 | Knott et al. |
| 2020/0377640 A1 | 12/2020 | Knott et al. |
| 2020/0377660 A1 | 12/2020 | Knott et al. |
| 2020/0377663 A1 | 12/2020 | Favresse et al. |
| 2020/0377665 A1 | 12/2020 | Knott et al. |
| 2020/0377666 A1 | 12/2020 | Knott et al. |
| 2020/0377667 A1 | 12/2020 | Favresse et al. |
| 2020/0377668 A1 | 12/2020 | Favresse et al. |
| 2020/0377669 A1 | 12/2020 | Knott et al. |
| 2020/0377686 A1 | 12/2020 | Knott et al. |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0253799 A1 | 8/2021 | Knott et al. |
| 2021/0371598 A1 | 12/2021 | Knott et al. |
| 2021/0403753 A1 | 12/2021 | Schulte et al. |
| 2022/0033587 A1 | 2/2022 | Knott et al. |
| 2022/0119617 A1 | 4/2022 | Knott et al. |
| 2022/0177652 A1 | 6/2022 | De Gans et al. |

FOREIGN PATENT DOCUMENTS

| | | |
|---|---|---|
| CN | 105670501 | 6/2016 |
| CN | 105131293 | 3/2018 |
| DE | 3412648 | 6/1987 |
| DE | 20 2010 017 915 | 3/2013 |
| DE | 20 2009 019 002 | 5/2015 |
| EP | 0 157 318 | 8/1989 |
| EP | 0 514 737 | 11/1992 |
| EP | 0 964 020 | 4/2003 |
| EP | 0 771 835 | 3/2005 |
| EP | 2 198 932 | 6/2010 |
| EP | 3 611 215 | 2/2020 |
| EP | 4011992 | 6/2022 |
| WO | 2012/040305 | 3/2012 |
| WO | 2014/187972 | 11/2014 |
| WO | 2019/200579 | 10/2019 |

OTHER PUBLICATIONS

Robeyns et al., "Synthesis, characterization and modification of silicone resins: An 'Augmented Review'", Progress in Organic Coatings, vol. 125, 2018, pp. 287-315.
U.S. Appl. No. 10/083,763, filed Feb. 25, 2002, Burkhart et al.
U.S. Appl. No. 12/414,805, filed Mar. 31, 2009, Schubert et al.
U.S. Appl. No. 13/650,221, filed Oct. 12, 2012, Knott et al.
U.S. Appl. No. 14/282,608, filed May 20, 2014, Henning et al.
U.S. Appl. No. 13/153,622, filed Jun. 6, 2011, Knott et al.
U.S. Appl. No. 15/510,282, filed Mar. 10, 2017, Anselmann et al.
U.S. Appl. No. 16/759,413, filed Apr. 27, 2020, Knott et al.
U.S. Appl. No. 17/147,592, filed Jan. 13, 2021, Knott et al.
U.S. Appl. No. 17/297,372, filed May 26, 2021, Knott et al.
U.S. Appl. No. 16/851,385, filed Apr. 17, 2020, Knott et al.
U.S. Appl. No. 17/457,944, filed Dec. 7, 2021, De Gans et al.
U.S. Appl. No. 17/145,558, filed Jan. 11, 2021, Knott et al.
U.S. Appl. No. 17/355,385, filed Jun. 23, 2021, Schulte et al.
U.S. Appl. No. 17/239,011, filed Apr. 23, 2021, Knott et al.
U.S. Appl. No. 17/476,417, filed Sep. 15, 2021, Knott et al.
European Search Report dated Apr. 19, 2023, in European Application No. 22207737.2, 6 pages.

* cited by examiner

CURABLE CONDENSATION COMPOUNDS BASED ON ALKOXY-FUNCTIONAL POLYSILOXANES

CROSS-REFERENCE TO RELATED APPLICATIONS

This application claims priority to European Application No. 21210450.9, filed on Nov. 25, 2021, the content of which is hereby incorporated by reference in its entirety.

BACKGROUND OF THE INVENTION

Field of the Invention

The invention relates to curable condensation compounds based on alkoxy-functional polysiloxanes, to preparation processes therefor and to the use thereof in coating systems having a propensity to repel soil among other properties.

Description of Related Art

Coatings are applied to surfaces for decorative, functional or protective purposes. The demand for surface protection is continually increasing in different industry sectors, such as aerospace, automotive, rail vehicle, shipbuilding and wind energy.

Various technologies are employed in the functionalization of surfaces and coatings. The approach to surface functionalization by micro- and nanostructuring of coatings derived from the scale structure of sharks is known from the literature. Such surfaces are employed in component parts of ships, aeroplanes, rotor blades of wind energy plants or pipelines to reduce flow resistance. Self-healing coatings have also been developed where, in the event of mechanical damage to the system, encapsulated functional active ingredients are released and then display their healing activity. These self-healing surfaces are of interest for corrosion protection.

A further known problem is the defilement caused by vandalism, for example graffiti on walls or objects. This problem affects not only local authorities, but particularly also transport companies. This is because the cleaning of such surfaces is very inconvenient and costly.

Great efforts have been made in the development of cleaning techniques for removal of graffiti. A customary technique is the removal of the surface with a paint remover, for instance methylene chloride, benzene or toluene. According to the substrate, temperature and colourant and the particular exposure time, the colourant is removed by means of a high-pressure cleaner for example. This process can/must be repeated several times. Any graffiti residues can then be removed by sandblasting, which can require reworking of the surface in order to re-establish its former appearance. Another technique is costly and inconvenient repainting or recoating of the surface, which likewise takes a long time and can incur considerable costs.

Also known are anti-fouling coatings/foul-release coatings which prevent or at least markedly impede algal and bivalve overgrowth of surfaces in constant contact with water. Particularly in the case of structures subject to permanent contact with water, for example in the case of ships' hulls, buoys, fishing nets, draw and drain pipes for cooling, offshore drilling installations or water tanks that are exposed to seawater and/or freshwater, the adhesion and overgrowth of organisms (bio-fouling) causes considerable economic losses. In the case of ships, these result, for example, from the increase in friction and the associated increase in fuel consumption. In the case of static structures, surfaces are also subject to mechanical damage as a result of the increase in resistance to waves or flows, which leads to shorter maintenance cycles and hence also to reduced service life.

Foul-release coatings are often based on polysiloxanes or silicone elastomers, the mechanism of action of which is the formation of an anti-adhesion surface to which aquatic organisms cannot adhere or on which adhesive forces are so low that they are detached by the movement in the water.

It is therefore known to add polysiloxanes to coatings to achieve particular properties. Through the chemical modification of the polydimethylsiloxane chain, for example, it was possible to control the most important silicone properties, for instance compatibility, slip resistance or scratch resistance. The use of polysiloxanes is widespread and very complex.

Since the early days of the silicone industry, condensation-crosslinkable hydroxy- and/or especially alkoxy-terminated, but also acetoxy-functional, polydiorganosiloxanes have been of major significance as typical representatives of silicone resin precursors. For instance, the teaching of EP 0 157 318 B1 is aimed at a process for preparing silicone resin precursors of the general formula $R^2_a Si(OR^1)_b O_{(4-a-b)/2}$, which are obtained by alcoholysis/hydrolysis and partial condensation of organochlorosilanes with alcohol/water.

CN105131293 B addresses acetoxy-functionalized MQ resins and the preparation thereof. In a hydrolysis medium consisting of hydrochloric acid and ethanol, hexamethyldisiloxane and tetraethoxysilane are accordingly first converted to an ethoxy-functional silicone resin prepolymer, and this is modified in a second step by reaction with an organoacetoxysilane to give a self-crosslinking acetoxy MQ resin.

A similar direction is taken by the teaching of Clarke (U.S. Pat. No. 3,032,529), who describes stabilized organopolysiloxane resins. With the aim of preparing storage-stable silicone coating systems for wood, plastic, metal and ceramic surfaces that cure within 24 hours at room temperature, the document teaches the acylation of pure and/or mixed, incompletely condensed terminated diorganosiloxanes with acylating agents, preferably with triacyloxysilanes, in order to remove all Si-bonded hydroxyl groups.

Without emphasizing the utilization of acetoxysiloxanes. U.S. Pat. No. 4,585,705 (Broderick et al.) concerns organopolysiloxane-based release coatings that are curable on the substrate, which include hydroxy-functional methyl, phenyl and mixed methyl/phenyl resins alongside a methyltrimethoxysilane (derivative), and also small proportions of trimethylsilyl end-blocked diorganosiloxanes and titanate esters.

Likewise known is the linkage of terminally hydroxy-functional (PDM siloxanes) to a multifunctional acetoxysilane as crosslinker to give hydrolytically unstable siloxane prepolymers provided with acetoxy groups (H. F. Mark, Concise Encyclopedia of Polymer Science and Technology, 3rd edition, page 1112, Wiley-Verlag, (2013) and also in A. S. Hoffman et al., Biomaterials Science: An Introduction to Material in Medicine, 2nd Edition, pages 83-84, Elsevier Acad. Press, San Diego, (2004)).

With US 2009/0226609, Boisvert et al. claim Q-titanium-based silicone resins that are prepared by reacting a system consisting of di(t-butoxy)diacetoxysilane, tetrahydrofuran, water and tetra(t-butoxy)titanium.

According to C. Robeyns et al. (Progress in Organic Coatings 125, p. 287-315, (2018), what takes place here is firstly hydrolysis of the di(t-butoxy)diacetoxysilane to form ortho-silica Si(OH)$_4$, which then condenses with tetra(t-butoxy)titanium, releasing 4 equivalents of t-butanol, to give the mixed titanium-silicone resin.

However, the use of titanates is problematic with regard to their tendency to break down in the presence of water, since this leads to formation and precipitation of insoluble tetravalent titanium hydroxide that causes haze specifically in coating systems. This is especially true of those systems in which hydrolysis is conducted in the presence of titanates. To overcome this problem, specifically in the production of anti-abrasive coating systems for transparent polycarbonate, Leclaire (U.S. Pat. No. 5,357,024) proposes dilute reaction of an alkoxysilane hydrolysate having condensable ≡SiOH groups with an acyltitanate compound and with subsequent addition of water, such that this results in a siloxane pre-polymer having titanium bound therein within the range from 20% to 30% by weight of TiO$_2$ based on solids. Leclaire obtains the acyltitanate compounds by reacting tetraalkyl titanates or tetraalkoxytitanium compounds with carboxylic acids in nonaqueous solvents, for example in alcohols.

When these hydrolysable titanium compounds are used, Leclaire does not observe the formation of precipitates in the coating matrices, even when the hydrolysis of the silanes is effected under harsh conditions. Leclaire interprets this observation with the assumption that the acyloxy group(s) bound within the titanium compound reduce(s) reactivity of the titanium compound.

U.S. Pat. No. 5,357,024 goes on to teach that these acyltitanates are obtained proceeding from tetraalkyl titanates in which the alkoxy functions are substituted by acyloxy functions. The preparation is effected in the absence of water by reaction of a tetraalkoxytitanium or a tetraalkyl titanate of the formula Ti(OR')$_4$ in which the R' radicals may be the same or different with a carboxylic acid RCOOH, wherein the amount of the acid used for this reaction is chosen according to the number of alkoxy functions for which substitution is desired, in amounts of 1 to 4 equivalents of acid to 1 equivalent of tetraalkoxytitanium. The reaction is preferably effected in the presence of a suitable nonaqueous solvent, for example an alcohol such as isopropanol.

With the aim of obtaining a silane AB$_3$-type precursor for formation of hyperbranched polyethoxysiloxanes, Jaumann et al. in Macromol. Chem. Phys. 2003, 204, 1014-1026 describe the reaction of tetraethoxysilane with acetic anhydride that takes place at 137° C. and over a period of at least 38 hours (and even requires 89 hours in the thesis by M. Jaumann, Apr. 9, 2008, RWTH Aachen, p. 47), which releases ethyl acetate to form acetoxytriethoxysilane in yields of only about 39% as AB$_3$-type precursor. In an attempt to improve the unsatisfactory reaction kinetics, Jaumann also uses tetraethyl orthotitanate as catalyst in low and high dosage. With 0.155 mol % of added tetraethyl orthotitanate, the time required for the reaction that then proceeds with about 94% conversion is reduced to 14.5 hours. 0.95 mol % of added tetraethyl orthotitanate, with about 88% conversion, reduces the reaction time to 1.5 hours, but with severe loss of product purity. In the polyethoxysiloxane obtained therefrom, about 6 mol % of all silicon atoms comes from the tetraethoxysilane used (thesis by M. Jaumann, Apr. 9, 2008, RWTH Aachen, p. 47-50).

Likewise reflecting Jaumann's work, WO 2014/187972 claims the use of fluorine-free, highly branched polyalkoxysiloxanes for production of soil-repellent surface coatings having a level of branching of VG>0.4 according to a complicated calculation formula involving $^{29}$Si NMR spectroscopy. The highly branched polyalkoxysiloxane is prepared with tetraethoxysilane, acetic anhydride and tetrakis(trimethylsiloxy)titanium or with Dynasylan®40, acetic anhydride and titanium(IV) isopropoxide or with Dynasylan®40, acetic anhydride and α-n-butyl-ω-(trimethoxysilyl)ethylpolydimethylsiloxane.

Without emphasis on polyalkoxysiloxanes, the aim of the teaching of WO 2019/200579 is a polysiloxane composition for production of a room temperature crosslinking, noncorrosive elastomer containing a hydroxyl-terminated polyorganosiloxane, a diacetoxysilane, a multifunctional alkoxysilane, and a filler and a catalyst.

WO 2012/040305 discloses a curable composition comprising organosiloxane block copolymers having a weight-average molecular weight M$_w$ over 20 000 g/mol, wherein these are generated by the reaction of silanol group-bearing organosiloxane resins (component b) having linear geminal diacetoxy-substituted organosiloxanes (component a). What is meant here by "geminal diacetoxy-substituted" is that the organosiloxane has two adjacent acetoxy groups [—Si—(Oac)$_2$] in a terminal position on a silicon atom. These geminal diacetoxy-substituted organosiloxanes are prepared by reaction of silanol-terminated polydiorganosiloxanes with alkyltriacetoxysilanes. This process thus leads to multiple crosslinks about the centre of the acetoxysilane used. In this process, the acetic acid formed has to be removed from the system. The removal of the acetic acid release is difficult since it forms hydrogen bonds that hinder thermal separation thereof. Assurance of freedom from acid (and freedom from water) in the linear organosiloxane block copolymer is essential since it is otherwise unusable on acid-sensitive substrates. Preparation also requires a solvent since the reactants or silsesquioxanes used are solid.

SUMMARY OF THE INVENTION

It is therefore an object of the present invention to provide compounds suitable for production of coating systems, where these have improved anti-adhesive effect without significant impairment of the other properties and without having the disadvantages mentioned in the prior art.

In order to achieve the object, condensation compounds of the type specified at the outset are proposed, which are obtainable by the reaction of acetoxy group-bearing siloxanes of formula (I):

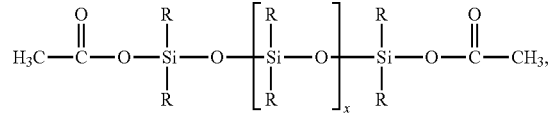

Formula (I)

where R=an alkyl radical having 1 to 4 carbon atoms and/or phenyl radical, preferably R=methyl radical, and 1≤x≤500, preferably 3≤x≤100, more preferably 5≤x≤50, where the acetoxy group-bearing siloxanes of formula (I) have not been end-equilibrated, with at least one alkoxy-functional polysiloxane of the formula (II)

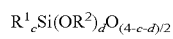

Formula (II)

in which c is not less than 0 to not more than 2 and d is not less than 0 to not more than 4, and the sum total of c+d is less than 4, $R^1$ is the same or different and is independently linear or branched, saturated or else mono- or polyunsaturated or aromatic hydrocarbon radicals, and $R^2$ is an alkyl group consisting of 1 to 8 carbon atoms, preferably a methyl or ethyl group, in the presence of a catalyst.

The invention also includes the following embodiments:

1. Curable condensation compounds obtainable by the reaction of acetoxy group-bearing siloxanes of formula (I):

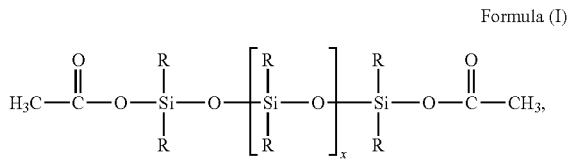

Formula (I)

where R=an alkyl radical having 1 to 4 carbon atoms and/or phenyl radical, preferably R=methyl radical, and $1 \leq x \leq 500$, preferably $3 \leq x \leq 100$, more preferably $5 \leq x \leq 50$, where the acetoxy group-bearing siloxanes of formula (I) have not been end-equilibrated, with at least one alkoxy-functional polysiloxane of the formula (II)

Formula (II)

in which c is not less than 0 to not more than 2 and d is not less than 0 to not more than 4, and the sum total of c+d is less than 4, $R^1$ is the same or different and is independently linear or branched, saturated or else mono- or polyunsaturated or aromatic hydrocarbon radicals, and $R^2$ is an alkyl group consisting of 1 to 8 carbon atoms, preferably a methyl or ethyl group, in the presence of a catalyst.

2. Condensation compounds according to embodiment 1, characterized in that the non-end-equilibrated acetoxy group-bearing siloxanes of formula (I) are obtainable by the reaction of linear α,ω-hydroxy group-bearing polysiloxanes with acetic anhydride.

3. Condensation compounds according to either of the preceding embodiments, characterized in that the reaction includes at least one crosslinker of formula (IV)

Formula (IV)

in which e is not less than 0 to not more than 2, f is not less than 2 to not more than 4, and the sum total of e+f is 4, $R^3$=a saturated or unsaturated alkyl group consisting of 1 to 8 carbon atoms or an aromatic moiety having 6 to 20 carbon atoms and $R^4$=an alkyl or acyl group consisting of 1 to 8 carbon atoms.

4. Condensation compounds according to any of the preceding embodiments, characterized in that acetoxy group-bearing siloxanes of formula (I) have exclusively D units.

5. Condensation compounds according to any of the preceding embodiments, characterized in that α,ω-acetoxy group-bearing linear polydimethylsiloxanes are used for the reaction.

6. Condensation compounds according to any of the preceding embodiments, characterized in that the alkoxy-functional polysiloxane has $R^1$ radicals=methyl and phenyl radicals.

7. Condensation compounds according to any of the preceding embodiments, characterized in that the weight-average molecular weight of the alkoxy-functional polysiloxanes is 200 to 20 000 g/mol, preferably 200 to 10 000 g/mol, more preferably 300 to 3000 g/mol and even further preferably 400 to 2000 g/mol.

8. Condensation compounds according to any of the preceding embodiments, characterized in that the alkoxy functionality of the alkoxy-functional polysiloxanes is from 50% to 3% by weight, preferably 40% to 5% by weight and more preferably 30% to 7% by weight, based on the total mass of the resin component.

9. Condensation compounds according to any of the preceding embodiments, characterized in that the catalyst is selected from tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates, bismuth triflate.

10. Condensation compounds according to any of the preceding embodiments, characterized in that the crosslinker is selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane and diethoxyphenylmethylsilane.

11. Process for preparing the condensation compounds according to any of embodiments 1-10, characterized in that non-end-equilibrated acetoxy group-bearing siloxanes of formula (I) are reacted with at least one alkoxy-functional polysiloxane of the formula (II) in the presence of a catalyst.

12. Process according to embodiment 11, characterized in that the weight ratio of acetoxy group-bearing siloxanes of formula (I) to alkoxy-functional polysiloxanes of formula (II) is 1:99 to 99:1, preferably 3:97 to 50:50 and more preferably 5:95 to 30:70, based on the overall silicone matrix.

13. Process according to either of embodiments 11-12, characterized in that the catalyst is formed in situ or prior to the reaction, preferably from a Lewis acids such as a titanium alkoxide and an anhydride such as acetic anhydride.

14. Process according to any of embodiments 11-13, characterized in that the acetoxy group-bearing siloxanes have D units.
15. Process according to any of embodiments 11-14, characterized in that non-end-equilibrated α,ω-acetoxy group-bearing linear polydimethylsiloxanes are used.
16. Process according to any of embodiments 11-15, characterized in that alkoxy-functional polysiloxanes having $R^1$ radicals=methyl and phenyl radicals are used.
17. Process according to any of embodiments 11-16, characterized in that the alkoxy functionality of the alkoxy-functional polysiloxanes is from 50% to 3% by weight, preferably 40% to 5% by weight and more preferably 30% to 7% by weight, based on the total mass of the resin component.
18. Process according to any of embodiments 11-17, characterized in that the catalyst is selected from tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl) zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates, bismuth triflate.
19. Process according to any of embodiments 11-18, characterized in that at least one crosslinker of formula (IV) is used.
20. Process according to any of embodiments 11-19, characterized in that the crosslinker is selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane and dimethoxyphenylmethylsilane.
21. Process according to any of embodiments 11-20, characterized in that the acetic ester formed from the $R^2$ radical and the acetoxy group is removed during the reaction.
22. Process according to embodiment 21, characterized in that the acetic ester formed is removed from the reaction by distillation and/or optionally with application of an auxiliary vacuum.
23. Process according to any of embodiments 11-22, characterized in that the condensation reaction is complete with respect to acetoxysiloxane/silane used.
24. Use of the curable condensation compounds according to any of embodiments 1-10 for production of coatings, preferably having anti-adhesive properties, anti-graffiti properties, anti-friction properties, hydrophobic properties and/or anti-fouling properties.
25. Coated product having a coating comprising a condensation compound according to any of embodiments 1-10.

DETAILED DESCRIPTION OF THE INVENTION

It has been found that the curable condensation compounds according to the invention can be used for production of coating systems having anti-adhesive properties, especially having anti-graffiti effect. Moreover, the coatings produced therefrom surprisingly have better surface slip than customary coatings.

It has been found that, surprisingly, the coating systems produced with the curable condensation compounds according to the invention have hydrophobic properties. The hydrophobicity of a coating serves, inter alia, as a barrier effect against the penetration of water in the event of damage to the paint surface into the substrate to be protected, for instance wood, brickwork or metal.

For assessment of hydrophobicity, the contact angle was used as a measure of the wettability of a solid-state body by a liquid. In the case of complete wetting or spreading, the contact angle is 0°. The solid-state body is considered to be hydrophilic between 0° and 90°, and hydrophobic above 90°. In the case of ultrahydrophobic materials having what is called the lotus effect, the contact angle approaches the theoretical limit of 180°.

It has been found that the coatings produced with the curable condensation compounds according to the invention have a higher water contact angle, of more than 90°, than customary coatings.

It was found in the tests that the coatings produced with the curable condensation compounds according to the invention prevent or reduce soiling adhesion of any kind and show no impairment of other properties.

The various fragments of the siloxane chains indicated in the formula (I) to formula (III) may be statistically distributed. Statistical distributions may have a blockwise construction with any number of blocks and any sequence or be subject to a randomized distribution; they may also have an alternating construction or else form a gradient along the chain; in particular, they may also form any mixed forms.

The indices recited herein and the value ranges for the indicated indices may be regarded as average values for the possible statistical distribution of the structures actual present and/or mixtures thereof.

In the context of this invention, the word fragment "poly" encompasses not just compounds having at least 3 repeat units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

Unless stated otherwise, percentages are FIGURES in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

The prior art discloses end-equilibrated acetoxy group-bearing siloxanes. Numerous synthesis methods are known to the person skilled in the art, for example from the teachings of European patent applications EP 3611215A, EP 18189072.4, EP18189075.7 and EP 18189074.0.

The preparation of end-equilibrated acetoxy group-bearing siloxanes based on cyclic siloxanes and acetic anhydride, as a result of the position of the chemical equilibrium, leaves behind considerable amounts of cyclic siloxanes, for example octamethylcyclotetrasiloxane, which constitute a hazard to man and the environment. The separation thereof by distillation is associated with great cost and inconvenience. Experience has shown that the distillative removal of siloxane cycles from end-equilibrated acetoxysiloxanes always additionally removes certain proportions of short-chain acetoxysiloxanes which, if they are not fed back to a new synthesis, constitute an economic loss. Moreover, the short-chain acetoxysiloxanes have a positive influence on the later use properties of the condensation compounds described in accordance with the invention.

For the condensation compounds according to the invention, therefore, non-end-equilibrated acetoxy group-bearing siloxanes based on silanol group-bearing siloxanes and acetic anhydride are used. In view of the fact that this method does not form any additional cycles, there is no need for a distillation. It is found to be advantageous that, as a result of the higher proportions of short-chain and hence very reactive acetoxysiloxanes, the condensation compounds prepared in accordance with the invention have marginally improved curing kinetics, which is desirable for certain applications.

Preference is given in accordance with the invention to using linear α,ω-hydroxy group-bearing siloxanes at least of the formula (III):

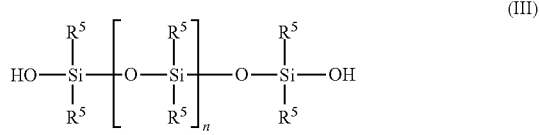

(III)

with R⁵=alkyl radical and/or aromatic radical, comprising 1 to 10 carbon atoms, preferably a methyl radical, and with 1≤n≤500, preferably 3≤n≤100, more preferably 5≤n≤50.

Such linear α,ω-hydroxy group-bearing siloxanes are obtainable, for example, under the following names: Polymer OH (from Evonik), PDM siloxane (from Wacker), Xiameter OHX or Dowsil 2-1273 Fluid (both from Dow).

Preferably, the non-end-equilibrated acetoxy group-bearing siloxanes of formula (I) are obtainable by the reaction of linear α,ω-hydroxy group-bearing polysiloxanes with acetic anhydride.

Preferably, the non-end-equilibrated acetoxy group-bearing siloxanes of formula (I) have exclusively D units.

Preference is given to using non-end-equilibrated α,ω-acetoxy group-bearing linear polydimethylsiloxanes for the reaction.

Acetoxysiloxanes and acetoxy group-bearing siloxanes are used here as synonyms.

Suitable alkoxy-functional polysiloxanes of the formula (II) are frequently also referred to as silicone resins. This formula relates to the smallest unit of the averaged structural formula of the silicone polymer. The number of repeat units can be established from the number-average Mn determined by GPC.

The production of silicone resins of these kinds has long been known in the literature (see for example W. Noll—Chemie und Technologie der Silicone [Chemistry and Technology of the Silicones], Wiley-VCH Verlag GmbH & Co. KGaA, Weinheim, 1960) and is also described in German patent specification DE 34 12 648.

The R¹ radicals are preferably independently saturated, branched or unbranched alkyl radicals having 1 to 17 carbon atoms and/or are mono- or polyunsaturated, branched or unbranched alkenyl radicals having 2 to 17 carbon atoms or aromatic groups having 6 to 12 carbon atoms. The alkyl and alkenyl radicals more preferably have up to 12, further preferably up to 8, carbon atoms. More preferably, all R¹ radicals are methyl and/or phenyl.

The R² radicals are preferably independently saturated, branched or branched alkyl radicals having 1 to 8 carbon atoms. Preferably, R² is selected from methyl or ethyl groups. The latter are particularly suitable for phenylpolysiloxanes or phenylalkylpolysiloxanes that are designated HAPS-free (hazardous air pollutant substance-free), which do not contain solvents such as toluene, xylene or benzene and which also release no methanol but only ethanol in the catalytic hydrolysis-condensation crosslinking that takes place at room temperature.

Preferred compounds of the general formula (II) have methyl and/or ethyl groups as R² radical, with an alkoxy functionality of 3% to 50% by weight, preferably 5% to 40% by weight, more preferably 7% to 30% by weight, based on the total mass of the compound.

The weight-average molecular weight $M_w$ of the compound of the general formula (II) is preferably 200 to 20 000 g/mol, more preferably 200 to 10 000 g/mol, further preferably 200 to 3000 g/mol or especially preferably 400 to 2000 g/mol.

For the reaction according to the invention, a major role is played by the alkoxy functionality of the polysiloxanes of the general formula (II).

Alkoxy-functional in the sense of the present invention means that, in the polysiloxane, there are alkyl groups bonded to silicon via oxygen. Preferably, alkoxy-functional means the presence of Si—O—R groups. The alkoxy functionality indicates the proportion by mass of alkoxy groups based on the polysiloxane.

It should be noted here that the use of alkoxy-functional polysiloxanes of the formula (II) is found to be advantageous over the use of the silanols detailed in the prior art. The storage stability of siloxanes bearing ≡SiOH groups is very limited, especially under the influence of traces of acids and bases that are always ubiquitously present. Furthermore, the silanol-functional polysiloxanes that are typically used for coating systems are generally solid and always require a solvent for processing thereof, in order either to further functionalize or else apply them. Once applied to a substrate, polysiloxanes bearing silanol groups are less reactive compared to systems bearing alkoxy groups, and need high temperatures for crosslinking to take place. It is thus not possible to use silanol-functional polysiloxanes on thermally sensitive substrates. Silanol-functional polymers are therefore unsuitable for exterior applications on non-heatable substrates, for example for an anti-graffiti coating.

Preference is given to the polysiloxanes of the general formula (II) where R¹ is methyl, known as methylsilicone resins, having an alkoxy functionality of 7% to 35% by weight based on the total mass of the polysiloxanes and a weight-average molar mass of 300 to 2000 g/mol.

Also preferred are the polysiloxanes of the general formula (II) where R¹ is phenyl, called phenyl resins. They preferably have a proportion of alkoxy groups of 1% to 40% by weight based on the polysiloxane, more preferably 3% to 35% by weight and most preferably 5% to 30% by weight.

Further preferably, the weight-average molecular weight Mw of the phenyl resins is 200 to 10 000 g/mol, preferably 200 to 3000 g/mol, more preferably 300 to 2000 g/mol.

The molecular weight Mw of the phenyl resins is more preferably 700 to 2000 g/mol.

In a further embodiment, preference is given to the polysiloxanes of the general formula (II) where $R^1$ comprises phenyl and methyl groups, called methyl-phenyl resins.

Particularly preferred methyl-phenyl resins have methoxy and/or ethoxy groups as alkoxy groups, the proportion of the alkoxy groups, more particularly of the methoxy and/or ethoxy groups, being at least 1% by weight based on the polysiloxane, preferably 2% to 40% by weight, more preferably 3% to 35% by weight and most preferably 5% to 30% by weight.

The numerical phenyl-to-methyl ratio, based on the number of moles in the resin, is preferably in the range from 1:0.1 to 0.1:1, more preferably in the range from 0.5:1 to 1:0.5.

Where chemical (empirical) formulae are used in the present invention, the specified indices can be not only absolute numbers but also average values.

For polymeric compounds, the indices preferably represent average values.

Unless stated otherwise, percentages are FIGURES in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

The condensation compounds according to the invention are preferably prepared using a catalyst selected from tin diacetate, tin dioctoate, dibutyltin diacetylacetonate, dibutyltin dilaurate, tin tetraacetate, dibutyltin diacetate, dibutyltin dioctoate, dibutyltin dioleate, dioctyltin dilaurate, dioctyltin dineodecanoate, dimethoxydibutyltin, dimethyltin, dibutyltinbenzyl maleate, bis(triethoxysiloxy)dibutyltin, diphenyltin diacetate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates and bismuth triflate. Other catalysts that may be used are iron(II) and iron(III) compounds, for example iron(III) acetylacetonate or iron(II) acetate, aluminium compounds, for example aluminium acetylacetonate, calcium compounds, for example calcium ethylenediaminetetraacetate, or magnesium compounds, for example magnesium ethylenediaminetetraacetate.

It is also conceivable to use perfluoroalkanesulfonic acid, for example trifluoromethanesulfonic acid or perfluorobutanesulfonic acid, as catalyst.

Preference is given to using a catalyst according to the invention which is described in detail and elucidated further up.

The reaction preferably includes at least one crosslinker of formula (IV)

$$R^3{}_e Si(OR^4)_f \quad \text{Formula (IV)}$$

in which e is not less than 0 to not more than 2, f is not less than 2 to not more than 4, and the sum total of e+f is 4, $R^3$=a saturated or unsaturated alkyl group consisting of 1 to 8 carbon atoms, or an organic moiety consisting of 1 to 8 carbon atoms and 1 to 2 nitrogen atoms or an aromatic moiety having 6 to 20 carbon atoms and $R^4$=an alkyl or acyl group consisting of 1 to 8 carbon atoms.

Alkyl groups are preferably methyl, ethyl, propyl, isopropyl, n-butyl, s-butyl and t-butyl groups. The aromatic moiety is preferably a phenyl moiety. Preferred substituents $R^3$ are methyl or phenyl radicals, or mixtures of methyl and phenyl radicals. Preferred alkyl groups for the $R^4$ radical are methyl, ethyl, propyl, isopropyl, n-butyl, s-butyl and tert-butyl groups.

The crosslinker is preferably selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltrethoxysilane, dimethyldimethoxysilane, dimethyldiethoxysilane, dimethoxyphenylmethylsilane and diethoxyphenylmethylsilane.

Advantageously, it is therefore possible by the process according to the invention to increase the level of branching of the condensation compounds by adding a) branched acetoxysiloxane and/or b) a branching crosslinker to the reaction matrix.

Furthermore, according to the invention, there is a possibility of subsequent crosslinking with an associated increase in molar mass in that the branched condensation compounds are reacted with additional acetoxysiloxanes.

The terms "siloxanes" and "polysiloxanes", whether as part of a word or alone, are understood to be synonyms in the present invention.

The curable condensation compounds according to the invention preferably contain the crosslinker in amounts of 0% to 20% by weight, preferably 0% to 10% by weight and more preferably 0% to 5% by weight, based on the total mass of the curable condensation compounds.

It is additionally also desirable to provide a process by which curable condensation compounds based on alkoxyfunctional polysiloxanes can be prepared easily and without the disadvantages known from the prior art.

It has now been found that, surprisingly, it is possible both without the use of organochlorosilanes mentioned at the outset and without the use of alcoholysis/hydrolysis operations that are difficult to control, in a simple and unambiguous manner, to arrive at curable condensation compounds based on alkoxy-functional polysiloxanes that are free of ≡Si—OH groups by reacting non-end-equilibrated acetoxy group-bearing siloxanes of formula (I) with at least one alkoxy-functional polysiloxane of the formula (II) in the presence of a catalyst.

The weight ratio of acetoxy group-bearing siloxanes of formula (I) to alkoxy-functional polysiloxanes of formula (II) is preferably 1:99 to 99:1, more preferably 3:97 to 50:50 and especially preferably 5:95 to 30:70, based on the overall silicone matrix.

It is possible to use any customary catalysts. Preferred catalysts have been described above.

In addition, it has been found that, surprisingly, the process according to the invention is most preferably performed in the presence of a silicone matrix-compatible catalyst which is obtained, for example, prior to commencement of the condensation reaction to be catalysed by reacting titanium alkoxides with acetic anhydride or else titanium alkoxides with acetoxysiloxanes.

Reaction matrix and silicone matrix are used here as synonyms, being composed essentially of compounds of the formula (I) and compounds of the formula (II).

More particularly, the catalyst that results in accordance with the invention from the reaction of titanium alkoxides with acetoxysiloxane can also be prepared in situ.

The preparation of the novel catalyst thus forms a further part of the subject-matter of the invention. The catalyst according to the invention can preferably be prepared from titanium alkoxides with acetic anhydride or from titanium alkoxides with acetoxysiloxanes. More preferably, the catalyst according to the invention can be prepared from titanium alkoxides and acetoxysiloxane in situ, i.e. during the reaction of compounds of the formula (I) with compounds of the formula (II).

The catalyst resulting from the reaction of titanium alkoxides with acetoxysiloxanes has excellent compatibility with the reaction matrix and permits both the timely rapid reaction of alkoxypolysiloxanes with acetoxysiloxanes and the curing of the curable condensation compounds that result therefrom under the usual atmosphere.

In a preferred configuration variant, it is possible in accordance with the invention first to premix acetoxysiloxane and alkoxy-functional polysiloxane and then to contact them with titanium alkoxide and/or more preferably with the condensation catalyst that resulted from the reaction of acetoxysiloxane with titanium alkoxide.

Alternatively preferably, it is possible in accordance with the invention to prepare the silicon matrix-compatible condensation catalyst by mixing and prior reaction of acetoxysiloxane with titanium alkoxide. Adding the alkoxy-functional polysiloxane then forms the condensable reaction matrix.

In the context of the present invention, the compatibility of the condensation catalyst is determined by the occurrence or lack of occurrence of haze after introduction thereof into the reaction matrix or after formation thereof in situ therein. If a volume aliquot taken from the reaction matrix for this purpose is introduced into a glass cuvette of thickness 10 mm and a text immediately behind it (printed in black in Arial size 12 on white paper) can be read without distortion in daylight or artificial light, the reaction matrix is considered to be free of haze, and the condensation catalyst is considered to be compatible in accordance with the invention.

In a further, preferred configuration of the invention, acetoxysiloxane, alkoxypolysiloxane and titanium alkoxide are reacted with intensive mixing.

According to the invention, all the catalysts mentioned can be used in amounts of 0.01% to 10.0% by weight, preferably of 0.05% to 7.5% by weight, more preferably 0.1% to 5.0% by weight, based on the reaction matrix consisting of alkoxypolysiloxane and acetoxysiloxane.

The alkoxy-functional polysiloxanes of formula (II) and end-equilibrated acetoxy group-bearing siloxanes of formula (I), including their preferred embodiments, that are used for the process according to the invention are described in detail above.

According to the invention, the condensation reaction can be completed by removing the acetic ester formed from the $R^2$ radical and the acetoxy group during the reaction. The removal of the acetic ester released from the reaction matrix can be effected under standard pressure or more preferably under reduced pressure, i.e. with application of an auxiliary vacuum. Further options are known to the person skilled in the art.

According to the invention, the condensation reaction alkoxy-functional polysiloxanes with acetoxysiloxanes can be performed either in neat form, i.e. without use of solvents, but also in solution. Examples of suitable solvents include aromatics, alkylaromatics, but also aliphatic hydrocarbons.

Preference is given to using solvents having a boiling point higher than the boiling point of the acetic ester released from the condensation reaction, formed from the $R^2$ radical and the acetoxy group.

Condensation reaction and reaction are used here as synonyms.

Preference is given to using a crosslinker of the formula (IV). Preferred crosslinker compounds have been described above.

It is conceivable that the crosslinker is used as a mixture consisting of at least two crosslinkers. As an example, it is possible to use a mixture of phenyltrimethoxysilane and methylphenyldimethoxysilane as a monomer blend for the purposes of the present invention.

$^{29}$Si NMR spectroscopy, supplemented by GPC, can be used to monitor the reaction. $^{29}$Si NMR spectroscopy in particular enables monitoring of conversion via the observation of the characteristic signal for the Si-acetoxy moiety.

Taking the disappearance of the $^{29}$Si NMR signal typical of acetoxysiloxanes at −9 ppm as a reliable indicator of complete conversion, for example, the reaction mixtures according to the invention that are detailed in the examples attain quantitative conversion after 1 to 3 hours.

The curable condensation compounds obtained in accordance with the invention have the advantage that they do not contain any fractions at all of siloxanes bearing ≡Si—OH groups. The shortcomings that emanate especially from the elevated presence of ≡Si—OH groups in alkoxy-functional polysiloxanes have been sufficiently discussed, for example, in WO 2014/187972, and specifically therein for hyperbranched polyalkoxysiloxane additives with reference to the aspect of their lack of storage stability (page 8), and also in patent specification EP 0771835 B1 with regard to their lack of storage stability (page 4 lines 29-30), and in EP 0964020 B1 with regard to inadequate resistance to speck formation on processing of the alkoxy-functional polysiloxane in a coating composition (page 3, [0026]).

The condensation compounds that are curable in accordance with the invention are preferably clear to slightly cloudy liquids which, with respect to the starting materials used (formula (I) and formula (II)), have a distinct increase in molar mass that can be readily appreciated with the aid of GPC analysis.

It has also been found that the curable condensation compounds according to the invention, on account of catalyst component remaining in the system, have a certain self-curing character ("1K character").

If even faster partial and complete drying times beyond that should be desired, it is advisable to add further curing catalysts. Customary curing catalysts are known to the person skilled in the art. A few are listed here by way of example: 3-aminopropyltriethoxysilane, 3-aminopropyltrimethoxysilane, tetra(i-propyl) titanate, tetra(n-butyl) titanate, 1,1,3,3-tetramethylguanidine, 1,8-diazabicyclo[5.4.0]undec-7-ene, 1,5-diazabicyclo[4.3.0]non-5-ene and dioctyltin dilaurate.

A further aim of the present invention was to provide coating compositions having anti-graffiti effect that do not unfavourably alter the properties of the substrate. For instance, the inks or paints used for production of graffiti are no longer to adhere, or to adhere only weakly, on the substrate by virtue of a coating according to the invention having anti-graffiti effect, and spray-painted substrates should be easy to clean, such that, for example, water, cloths, surfactants, high-pressure cleaners and mild solvents are adequate. A complex cleaning procedure as known from the prior art is to be avoided as far as possible.

Surprisingly, it has been found that the coatings according to the invention withstand multiple cleaning cycles without losing their anti-graffiti effect, for example. Thus, the coatings according to the invention as far superior to those from the prior art over their technical lifetime. The user, for example, need not apply a new protective layer after every cleaning process, which means an economic benefit.

Surprisingly, coated products having a coating containing the curable condensation compounds according to the invention have anti-adhesive properties, anti-graffiti properties, anti-friction properties, hydrophobic properties and/or anti-fouling properties.

The use of the curable condensation compounds according to the invention for production of coatings having anti-adhesive properties, anti-graffiti properties, anti-friction properties, hydrophobic properties and/or anti-fouling properties also forms part of the subject-matter of this invention.

Coatings, lacquers, paints, inks, coverings, sealants and adhesives obtainable through use of the curable condensation compounds according to the invention also form a further part of the subject-matter of the invention.

It is known to the person skilled in the art that coatings may also contain adhesion promoters, for example aminosilanes, UV stabilizers, fillers, pigments, thixotropic agents, for example fumed silica, reactive diluents or crosslinkers, for example silanes, solvents, for example xylene, levelling agents, defoamers or accelerators.

The invention is to be elucidated in detail hereinafter by working examples.

Methods

Nuclear Magnetic Resonance (NMR)

NMR spectra are measured with the aid of a Bruker Avance III 400 spectrometer. $^{29}$Si-NMR spectra are measured at a frequency of 79 495 MHz using a Bruker PA BBO 400Si BB-H-D-10 z probe. The measurement time was 2569 seconds per scan, at 512 scans per spectrum.

Gel Permeation Chromatography (GPC)

Molar masses and molar mass distribution are determined to DIN 55672-1. The method described is not an absolute method. Instead, there is a need for calibration, which is conducted with commercially available polystyrene standards that have a linear structure and are characterized by independent absolute methods. Instrument: Agilent 1100 from Agilent Technologies, column combination: SDV 1000/10000 Å, length 65.00 cm, temperature 30° C., tetrahydrofuran as mobile phase, flow rate 1 ml/min, sample concentration 10 g/l. RI detector, evaluation against a polystyrene standard in the molar mass ratio of 162-2 520 000 g·mol$^{-1}$.

Anti-Graffiti Effect a) Anti-graffiti effect is determined in accordance with ASTM D7089-06. The condensation compounds according to the invention were applied to aluminium Q-Panels with a 100 µm spiral applicator. The coated panels were dried for 24 hours.

Then half of each panel was lacquered, using a spray can, with a commercial blue-pigmented nitrocellulose lacquer (FLT Handel & Service GmbH) and dried for 24 hours. Subsequently, the coated sheets with the blue lacquer paint were subjected to a jet of water at a pressure of 5 bar until the blue lacquer can be completely removed. This typically takes not more than 5 minutes. Small residues of paint at the edges of the panels are neglected here.

What is being examined here is whether the coating shows an anti-graffiti effect or not.

b) The panels that withstood this first cycle were dried again and lacquered once again with the spray can and dried. The test was repeated correspondingly with the jet of water until the blue lacquer layer can no longer be removed.

The number of cycles indicates how often a coating has withstood the cleaning procedure before it no longer has any anti-graffiti effect.

The more cleaning cycles a coating has, the greater its economic viability.

Slip Resistance Value G (cN)

A useful method of measuring slip resistance has been found to be a test method in which the friction force is measured. The method is carried out by means of a Bluehill instrument from Instron.

A 500 g weight with defined felt underlay is pulled here uniformly across the coating surface by a tensile tester. The force required for this purpose is measured with an electronic force transducer. The test is carried out at a constant speed of 12 mm/sec and enables a reproducible measurement with high accuracy. For the test, a coating composition according to the invention containing condensation compounds according to the invention was applied to aluminium Q-Panels with the aid of a 100 µm spiral applicator and dried for 24 h.

The lower the slip resistance value G (cN), the higher the surface slip of the coating surface.

Contact Angle

The contact angle of water is determined to DIN 55660. Measurements were conducted using an OCA 20 contact angle measuring instrument (from DataPhysics Instruments GmbH) with the aid of the SCA 20 software from the same manufacturer. This was done by clamping coated aluminium test sheets into the contact angle measuring instrument and dripping 5 µl drips of fully deionized water onto the coating. The contact angle was measured using the software after a wait time of one minute. For the test, a coating composition according to the invention containing condensation compounds according to the invention was applied to aluminium Q-Panels with the aid of a 100 µm spiral applicator and dried for 24 hours.

Compatibility of the Catalyst According to the Invention

According to the invention, the compatibility of the condensation catalyst is determined by the occurrence or lack of occurrence of haze after introduction thereof or after formation thereof in situ in the reaction matrix.

If an aliquot taken from the reaction matrix for this purpose is introduced into a glass cuvette of thickness 10 mm and a text immediately behind it (font: Arial, font weight: standard, font colour: black on white paper) can be read without distortion in daylight or artificial light, the reaction matrix is considered to be free of haze, and the catalyst is considered to be compatible in accordance with the invention.

Further Conditions

Where values are reported in % in the context of the present invention, these are % by weight values, unless stated otherwise. In the case of compositions, percentages, unless defined differently, are based on the overall composition. Where averages are stated in the examples that follow, these are numerical averages unless stated otherwise. Where reference is made hereinafter to measured values, these measured values were determined at a pressure of 101 325 Pa, a temperature of 21° C. and ambient relative humidity of approx. 40% unless stated otherwise. Where coatings are dried hereinafter, this is likewise accomplished at a pressure of 101 325 Pa, a temperature of 21° C. and ambient relative humidity of approx. 40% unless stated otherwise.

Materials and Equipment

Acetic anhydride, from Merck
PDM siloxane, from Wacker
Tetra-n-butyl titanate, from ABCR
Tetra-i-propyl titanate, from ABCR
Toluene, from Reininghaus Chemie
Sodium hydrogencarbonate, from Sigma-Aldrich
Silikophen AC1000 (poly(methyltrimethoxysilane)), from Evonik Industries
Rotavapor R-300 rotary evaporator, from Büchi
Rotavapor B-300 Base oil bath, from Büchi
Aluminium Q-Panels, 6"×3", from Q-Lab
Coloured spray lacquer, silky matt blue, FLT Handel & Service GmbH

EXAMPLES

1. Preparation of the Curable Condensation Compounds According to the Invention 1.1 Preparation of a Linear α,ω-Diacetoxysiloxane A 1 l four-neck round-bottom flask equipped with a precision glass stirrer, an internal thermometer, and a reflux condenser on top is initially charged with 650.0 g of PDM siloxane having a molecular weight of 2543 g/mol together with 52.18 g of acetic anhydride (0.51 mol) at 23° C. while stirring. The mixture is subsequently heated to 150° C. and kept at reaction temperature for 6 hours. After the reaction time, the reaction mixture is cooled down to 80° C.

In order to work up the reaction mixture, the reflux condenser is exchanged for a distillation system. The reaction mixture is distilled at 80° C. under reduced pressure (20 mbar) for 2 hours. The reaction mixture was subsequently neutralized with 14.04 g of sodium hydrogencarbonate. After stirring for a further 12 hours, the product was left to cool to room temperature and the solids were removed by filtration through a fluted filter. What is obtained is a clear terminal acetoxy group-bearing polysiloxane.

1.2 Reaction of the Linear α,ω-Diacetoxysiloxane with an Alkoxy-Functional Polysiloxane Example 1 (Inventive)

309.6 g of Silikophen AC1000, 31.2 g of α,ω-diacetoxysiloxane and 1.8 g of tetra-n-butyl titanate are weighed out in a 1 l one-neck round-bottom flask. An aliquot taken from the homogeneous reaction matrix for this purpose was introduced into a glass cuvette of thickness 10 mm and it was possible to read a text immediately behind it (font: Arial, font weight: standard, font colour: black on white paper) without distortion in artificial light, and so the reaction matrix was considered to be free of haze and the catalyst to be compatible in accordance with the invention. After the sample volume has been reintroduced into the reaction mixture, it is first mixed at 100 rpm and ambient pressure on a rotary evaporator (Büchi Rotavapor R-300) at a temperature of the heating bath (Büchi Rotavapor B-300 Base) of 130° C. for one hour. An auxiliary vacuum of 600 mbar is then first applied for a duration of 2 hours, and then auxiliary vacuum of 100 mbar for a duration of a further 2 hours. The methyl acetate formed in the reaction is collected in a collecting flask. A $^{29}$Si NMR spectrum of the end product shows, by the disappearance of the signal at −9 ppm, that the terminal acetoxy groups originating from α,ω-diacetoxysiloxane have been fully converted. A GPC indicates a number-average molecular weight $M_n$ of 847 g/mol and a weight-average molecular weight $M_w$ of 2971 g/mol, and thus demonstrates a clear increase in molecular weight compared to the Silikophen AC1000 starting material ($M_n$ 586 and $M_w$ 859 g/mol).

Example 2 (Inventive)

A catalyst solution consisting of 0.81 g of tetra-i-propyl titanate, 0.30 g of acetic anhydride and 1.69 g of toluene was prepared. After the exothermicity has abated, the clear catalyst solution thus obtained is usable directly.

In analogy to Example 1, 94.9 g of Silikophen AC1000, 9.5 g of α,ω-diacetoxysiloxane and 0.9 g of catalyst solution are weighed out in a 500 ml one-neck round-bottom flask. An aliquot taken from the homogeneous reaction matrix for this purpose was introduced into a glass cuvette of thickness 10 mm and it was possible to read a text immediately behind it (font: Arial, font weight: standard, font colour black on white paper) without distortion in artificial light, and so the reaction matrix was considered to be free of haze and the catalyst to be compatible in accordance with the invention. After the sample volume has been reintroduced into the reaction mixture, it is heated to 130° C. on a rotary evaporator and reacted. A $^{29}$Si NMR spectrum of the end product shows, by the disappearance of the signal at −9 ppm, that the terminal acetoxy groups originating from α,ω-diacetoxysiloxane have been fully converted. A GPC indicates a number-average molecular weight $M_n$ of 905 g/mol and a weight-average molecular weight $M_w$ of 3021 g/mol, and thus demonstrates a clear increase in molecular weight compared to the Silikophen AC1000 starting material ($M_n$ 586 and $M_w$ 859 g/mol).

2. Performance Testing:

2.1 Anti-Graffiti Effect

The panels coated with the curable condensation compounds according to the invention (Examples 1 and 2) were used to determine anti-graffiti properties. Both examples cured without the addition of curing catalysts. As comparative example CE, Silikophen AC1000 was applied to the panels and likewise cured with 1.5% by weight of tetra-n-butyl titanate (TnBT) based on the total amount of the resin. The results are listed in Table 1. It was found that comparative example CE did not show any anti-graffiti effect since the lacquer layer sprayed on was not removable. The coatings according to the invention, by contrast, had an anti-graffiti effect.

TABLE 1

Anti-graffiti effect

| Example | Anti-graffiti effect | Cycles |
|---|---|---|
| 1 | yes | 2 |
| 2 | yes | 2 |
| CE | no | 0 |

2.2 Surface Slip

As comparative example CE, Silikophen AC1000 was applied to the panel and cured with the aid of 1.5% by weight of tetra-n-butyl titanate based on the total amount of the resin. The results are collated in Table 2. It is found that the coatings according to the invention have a considerable reduction in slip value compared to the comparative example CE. The surface slip of the coating according to the invention is therefore better than that of the comparative example.

TABLE 2

Slip values

| Example | Slip value/cN |
|---|---|
| 1 | 70 |
| 2 | 65 |
| CE | 229 |

2.3 Contact Angle

As comparative example CE, Silikophen AC1000 was applied to the panel and cured with the aid of 1.5% by weight of tetra-n-butyl titanate based on the total amount of the resin.

The results are collated in Table 3. It is found that the coatings according to the invention have a higher contact angle compared to the comparative example CE. Inventive coatings 1 and 2 have a contact angle >90° and are thus hydrophobic; it is therefore made more difficult for water to penetrate through damage to the lacquer surface into the substrate, by contrast to the comparative example CE, which has a contact angle <90° and is therefore hydrophilic.

TABLE 3

Contact angle

| Example | Contact angle/° |
|---|---|
| 1 | 101 |
| 2 | 102 |
| CE | 78 |

The invention claimed is:

1. A curable condensation compound, obtained by a reaction of:
acetoxy group-bearing siloxanes of formula (I):

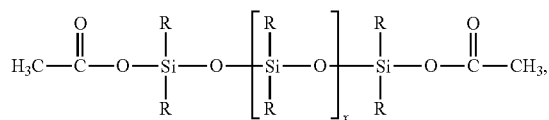  Formula (I)

wherein R=an alkyl radical having 1 to 4 carbon atoms and/or phenyl radical, and 1≤x≤500,
wherein the acetoxy group-bearing siloxanes of formula (I) have not been end-equilibrated,
with
at least one alkoxy-functional polysiloxane of the formula (II)

$$R^1_c Si(OR^2)_d O_{(4-c-d)/2}$$  Formula (II)

wherein c is not less than 0 to not more than 2, d is not less than 0 to not more than 4, and a sum total of c+d is less than 4,
$R^1$ is the same or different and is independently a linear or branched, saturated or else mono- or polyunsaturated or aromatic hydrocarbon radical, and
$R^2$ is an alkyl group consisting of 1 to 8 carbon atoms, and in the presence of a catalyst.

2. The condensation compound according to claim 1, wherein the non-end-equilibrated acetoxy group-bearing siloxanes of formula (I) are obtainable by a reaction of linear α,ω-hydroxy group-bearing polysiloxanes with acetic anhydride.

3. The condensation compound according to claim 1, wherein the acetoxy group-bearing siloxanes of formula (I) have exclusively D units.

4. The condensation compound according to claim 1, wherein the acetoxy group-bearing siloxanes of formula (I) are α,ω-acetoxy group-bearing linear polydimethylsiloxanes.

5. The condensation compound according to claim 1, wherein in the at least one alkoxy-functional polysiloxane, $R^1$=a methyl or phenyl radical.

6. The condensation compound according to claim 1, wherein a weight-average molecular weight of the at least one alkoxy-functional polysiloxane is 200 to 20,000 g/mol.

7. The condensation compound according to claim 1, wherein an alkoxy functionality of the at least one alkoxy-functional polysiloxane is from 50% to 3% by weight, based on a total mass of the at least one alkoxy-functional polysiloxane.

8. The condensation compound according to claim 1, wherein the catalyst is selected from the group consisting of tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, trisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylate, and bismuth triflate.

9. The condensation compound according to claim 1, wherein the reaction includes at least one crosslinker of formula (IV)

$$R^3_e Si(OR^4)_f$$  Formula (IV)

wherein e is not less than 0 to not more than 2, f is not less than 2 to not more than 4, and a sum total of e+f is 4, R³=a saturated or unsaturated alkyl group consisting of 1 to 8 carbon atoms or an aromatic moiety having 6 to 20 carbon atoms, and R⁴=an alkyl or acyl group consisting of 1 to 8 carbon atoms.

10. The condensation compound according to claim 9, wherein the at least one crosslinker is selected from the group consisting of methyltriacetoxysilane, ethyltriacetoxysilane, dimethyldiacetoxysilane, methyltrimethoxysilane, methyltriethoxysilane, vinyltimethoxysilane, vinyltriethoxysilane, tetramethoxysilane, tetraethoxysilane, phenyltrethoxysilane, phenyltrimethoxysilane, propyltimethoxysilane, propyltriethoxysilane, dimethyldimethoxysilane, dimethyldiethoxysilane, dimethoxyphenylmethylsilane, and diethoxyphenylmethylsilane.

11. A process for preparing the condensation compound according to claim 1, the process comprising:
reacting the non-end-equilibrated acetoxy group-bearing siloxanes of formula (I) with the at least one alkoxy-functional polysiloxane of the formula (II) in the presence of the catalyst.

12. The process according to claim 11, wherein a weight ratio of the acetoxy group-bearing siloxanes of formula (I) to the at least one alkoxy-functional polysiloxane of formula (II) is 1:99 to 99:1, based on an overall silicone matrix.

13. The process according to claim 11, wherein the catalyst is formed in situ or prior to the reaction.

14. The process according to claim 11, wherein the acetoxy group-bearing siloxanes of formula (I) have D units.

15. The process according to claim 11, wherein the acetoxy group-bearing siloxanes of formula (I) are non-end-equilibrated α,ω-acetoxy group-bearing linear polydimethylsiloxanes.

16. The process according to claim 11, wherein in the at least one alkoxy-functional polysiloxane, R¹=a methyl or phenyl radical.

17. The process according to claim 11, wherein an alkoxy functionality of the at least one alkoxy-functional polysiloxane is from 50% to 3% by weight, based on a total mass of the at least one alkoxy-functional polysiloxane.

18. The process according to claim 11, wherein the catalyst is selected from the group consisting of tin diacetate, tin dioctoate, dibutytin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylate, and bismuth triflate.

19. The process according claim 11, wherein the condensation reaction is complete with respect to acetoxysiloxane/silane used.

20. The process according to claim 11, wherein the reaction includes at least one crosslinker of formula (IV)

   Formula (IV)

wherein e is not less than 0 to not more than 2, f is not less than 2 to not more than 4, and a sum total of e+f is 4, R³=a saturated or unsaturated alkyl group consisting of 1 to 8 carbon atoms or an aromatic moiety having 6 to 20 carbon atoms, and R⁴=an alkyl or acyl group consisting of 1 to 8 carbon atoms.

21. The process according to claim 20, wherein the at least one crosslinker is selected from the group consisting of methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, and dimethoxyphenylmethylsilane.

22. The process according to claim 11, wherein an acetic ester formed from the R² radical and the acetoxy group is removed during the reaction.

23. The process according to claim 22, wherein the acetic ester formed is removed from the reaction by distillation and/or optionally with application of an auxiliary vacuum.

24. A method, comprising:
producing a coating with the curable condensation compound according to claim 1.

25. A coated product, having a coating comprising the condensation compound according to claim 1.

* * * * *